United States Patent
Corbitt

(10) Patent No.: US 7,340,858 B2
(45) Date of Patent: Mar. 11, 2008

(54) SLIP-ON HYDRODYNAMIC SYMMETRICAL FISHING SINKER

(75) Inventor: Newsome Corbitt, Jacksonville, FL (US)

(73) Assignee: I.Q. Innovations, LLC, Jacksonville, FL (US)

(*) Notice: Subject to any disclaimer, the term of this patent is extended or adjusted under 35 U.S.C. 154(b) by 218 days.

(21) Appl. No.: 11/021,957

(22) Filed: Dec. 24, 2004

(65) Prior Publication Data
US 2006/0137238 A1 Jun. 29, 2006

(51) Int. Cl.
A01K 95/00 (2006.01)
(52) U.S. Cl. ............... 43/44.96; 43/43.1; 43/44.87
(58) Field of Classification Search ........... 43/44.87, 43/44.96, 44.9, 43.1; 114/206
See application file for complete search history.

(56) References Cited

U.S. PATENT DOCUMENTS

| | | | | |
|---|---|---|---|---|
| 762,439 | A * | 6/1904 | Reddish | 43/44.96 |
| 876,328 | A * | 1/1908 | Chamberlin | 43/44.96 |
| 883,048 | A * | 3/1908 | Pflueger | 43/43.1 |
| 1,051,334 | A * | 1/1913 | Johnston | 114/300 |
| 1,127,747 | A * | 2/1915 | Fackenthall | 43/44.96 |
| 1,356,481 | A * | 10/1920 | Windle | 114/300 |
| 1,766,532 | A * | 6/1930 | Pflueger | 43/43.1 |
| 1,858,347 | A * | 5/1932 | Swift | 43/44.96 |
| 1,897,291 | A * | 2/1933 | Andrews | 43/43.1 |
| 2,033,683 | A * | 3/1936 | Clark | 43/44.96 |
| D100,482 | S * | 7/1936 | Tripp | 43/43.1 |
| D101,502 | S * | 10/1936 | Moitoza | 43/43.1 |
| 2,083,630 | A * | 6/1937 | Angelica | 43/43.1 |
| 2,153,869 | A * | 4/1939 | Jones | 43/44.91 |
| 2,187,991 | A * | 1/1940 | Tyler | 43/43.1 |
| 2,237,540 | A * | 4/1941 | Asprer | 43/44.96 |
| 2,250,038 | A * | 7/1941 | Sink | 43/44.96 |
| 2,256,768 | A * | 9/1941 | Taylor | 43/44.96 |
| 2,303,753 | A * | 12/1942 | Merle | 43/43.1 |
| 2,399,371 | A * | 4/1946 | Mendelson | 43/44.9 |
| 2,455,705 | A * | 12/1948 | Seager | 473/402 |
| 2,457,358 | A * | 12/1948 | Flaugher | 43/44.96 |
| 2,522,191 | A * | 9/1950 | Pillow | 43/44.96 |
| D162,660 | S * | 3/1951 | Humphrey | D22/145 |
| 2,573,981 | A * | 11/1951 | Nelson | 43/43.1 |
| 2,577,549 | A * | 12/1951 | Vice | 43/43.1 |

(Continued)

FOREIGN PATENT DOCUMENTS

AU          9058907 A  *  1/1991

(Continued)

*Primary Examiner*—Darren W. Ark
(74) *Attorney, Agent, or Firm*—Mark Young, P.A.

(57) ABSTRACT

A fishing sinker is comprised of a polyhedron body having a rectangular base and triangular sides with a common blunt vertex, adapted to generate a net upward lifting force during forward motion. The streamlined shape of the sinker also makes it more aerodynamic during casting and minimizes splashing during entry into water. A central channel is formed in the body for receiving an eyelet pin with a swaged end, a straight section extending through said central channel and an integrally formed eyelet portion protruding from the blunt vertex. A plurality of symmetrically arranged stabilizer fins extending along angles of intersection of each adjacent triangular side. The eyelet portion is a resilient eyelet with a slip-on opening biased into a closed position. The vertex makes the sinker quite aerodynamic, as it leads the way on casts through the air and into the water.

9 Claims, 3 Drawing Sheets

U.S. PATENT DOCUMENTS

| | | | | |
|---|---|---|---|---|
| 2,591,558 A * | 4/1952 | Kramer | ............ | 43/44.9 |
| 2,605,576 A * | 8/1952 | Young, Jr. et al. | ............ | 43/43.1 |
| 2,644,266 A * | 7/1953 | Updegrove | ............ | 43/44.96 |
| 2,651,136 A * | 9/1953 | Kruze | ............ | 43/44.96 |
| 2,695,587 A * | 11/1954 | Welter | ............ | 43/44.96 |
| 2,725,842 A * | 12/1955 | Norris et al. | ............ | 43/44.96 |
| 2,788,605 A * | 4/1957 | Rediess et al. | ............ | 43/43.1 |
| 2,801,490 A * | 8/1957 | Daves | ............ | 43/43.1 |
| 2,803,081 A * | 8/1957 | Nicholson | ............ | 43/43.1 |
| 2,917,861 A * | 12/1959 | Hines | ............ | 43/44.96 |
| 2,937,468 A * | 5/1960 | Scheifele | ............ | 43/43.1 |
| 2,941,805 A * | 6/1960 | Chupa | ............ | 43/43.1 |
| D191,166 S * | 8/1961 | Abramson | ............ | 43/43.1 |
| 3,103,199 A * | 9/1963 | Gagnon | ............ | 43/43.1 |
| 3,167,879 A * | 2/1965 | Beers | ............ | 43/44.96 |
| 3,204,364 A * | 9/1965 | Beers | ............ | 43/44.96 |
| 3,805,439 A * | 4/1974 | Krengel et al. | ............ | 43/43.1 |
| 4,019,275 A * | 4/1977 | Ruppe | ............ | 43/44.96 |
| 5,101,592 A * | 4/1992 | Merritt | ............ | 43/44.13 |
| D359,545 S * | 6/1995 | Canler | ............ | D22/145 |
| 5,720,235 A * | 2/1998 | Bartkus | ............ | 114/300 |
| 6,467,214 B1 * | 10/2002 | DeFrisco | ............ | 43/44.9 |
| 6,550,179 B1 * | 4/2003 | Seay | ............ | 43/44.88 |
| 6,594,943 B1 * | 7/2003 | Johnston | ............ | 43/43.13 |
| 6,874,272 B1 * | 4/2005 | Adams et al. | ............ | 43/44.96 |
| 6,993,866 B1 * | 2/2006 | Strange | ............ | 43/42.31 |
| 2003/0159333 A1 * | 8/2003 | Ryder | ............ | 43/44.87 |
| 2005/0172539 A1 * | 8/2005 | Lieb | ............ | 43/43.13 |

FOREIGN PATENT DOCUMENTS

| | | | | |
|---|---|---|---|---|
| FR | 2777745 | A1 * | 10/1999 | |
| FR | 2846851 | A1 * | 5/2004 | |
| GB | 2078472 | A * | 1/1982 | |
| GB | 2114411 | A * | 8/1983 | |
| GB | 2117211 | A * | 10/1983 | |
| GB | 2182531 | A * | 5/1987 | |
| GB | 2207841 | A * | 2/1989 | |
| GB | 2236039 | A * | 3/1991 | |
| GB | 2267806 | A * | 12/1993 | |
| GB | 2291327 | A * | 1/1996 | |
| GB | 2310121 | A * | 8/1997 | |
| GB | 2351641 | A * | 1/2001 | |
| GB | 2354146 | A * | 3/2001 | |
| JP | 05056732 | A * | 3/1993 | |
| JP | 06086617 | A * | 3/1994 | |
| JP | 08298906 | A * | 11/1996 | |
| JP | 09168356 | A * | 6/1997 | |
| JP | 10178997 | A * | 7/1998 | |
| JP | 10295242 | A * | 11/1998 | |
| JP | 11046649 | A * | 2/1999 | |
| JP | 11137141 | A * | 5/1999 | |
| JP | 11225637 | A * | 8/1999 | |
| JP | 11289921 | A * | 10/1999 | |
| JP | 2000050775 | A * | 2/2000 | |
| JP | 2000253786 | A * | 9/2000 | |
| JP | 2002000149 | A * | 1/2002 | |
| JP | 2004081082 | A * | 3/2004 | |
| JP | 2004290096 | A * | 10/2004 | |
| JP | 2007-68432 | A * | 3/2007 | |

* cited by examiner

SLIP-ON HYDRODYNAMIC SYMMETRICAL FISHING SINKER

FIELD OF THE INVENTION

This invention generally relates to fishing, and more particularly, to a finned sinker adapted to engage and disengage a fishing line without cutting the line and configured to resist snagging and to generate lift upon being reeled in.

BACKGROUND

Many fishing sinkers known in the art may adequately cause fishing line and attached bait or a lure to sink below the water surface. However, such known prior art sinkers have several shortcomings. First, they often become snagged or hung up, particularly in fishing areas with oyster beds, rocks, brush, weed beds, stumps or debris on the bottom. As a result, many of these snag infested fishing waters are considered "off limits" with certain conventional sinkers. Additionally, many conventional sinkers are rounded, which is conducive to rolling with the current. Rolling, which is pronounced in waters with strong currents, may undesirably twist the line. Such twisting may weaken the line, break the line, impede proper casting and cause the line to unravel from a spool and result in a twisted mess known as a backlash or birds nest. Furthermore, many conventional sinkers are tied or otherwise secured to the fishing line, thus preventing the bait from moving freely. As a fish bites the bait and begins to move off with it, the resistance causes the fish to become aware of the attached line. Concomitantly, a bite is not detected until it overcomes the weight of the sinker. Another shortcoming is that tackle must be removed to thread many conventional sinkers to a line.

A pyramid sinker with an eyelet protruding from a planar rectangular surface, as conceptually shown in FIG. 6, is popular when fishing in areas with strong currents. On soft bottoms the pyramid tends to bury itself and on hard bottoms the flat sides of the sinker will prevent it from rolling with the current. However, such sinkers do not generate lift as they are reeled in. Consequently, such sinkers tend to drag along the bottom, with the broad planar face frequently becoming snagged on weeds and debris.

The invention is directed to overcoming one or more of the problems as set forth above.

SUMMARY OF THE INVENTION

To solve one or more of the problems set forth above, in an exemplary implementation of the invention, a pyramid-like fishing sinker is provided. The sinker is comprised of a polyhedron body having a rectangular base and triangular sides with a common blunt vertex, adapted to generate a net upward lifting force during forward motion. A central channel is formed in the body for receiving an eyelet pin with a swaged end, a straight section extending through said central channel and an integrally formed eyelet portion protruding from the blunt vertex. The eyelet is free to spin, which prevents twisting of the line. A plurality of symmetrically arranged stabilizer fins extending along angles of intersection of each adjacent triangular side. The eyelet portion is a resilient eyelet with a slip-on opening biased into a closed position. The polyhedron body and plurality of fins are integrally formed and may be comprised of a material from the group consisting of lead, zinc, steel, stainless steel, babbitt, aluminum, and an alloy of lead, zinc, steel or aluminum. The sinker may be formed in various sizes and shapes to provide desired weight, stability and hydrodynamic characteristics.

BRIEF DESCRIPTION OF THE DRAWINGS

The foregoing and other objects, aspects and advantages will be better understood from the following detailed description of an embodiment of the invention with reference to the drawings, in which.

DETAILED DESCRIPTION

Figure 1:
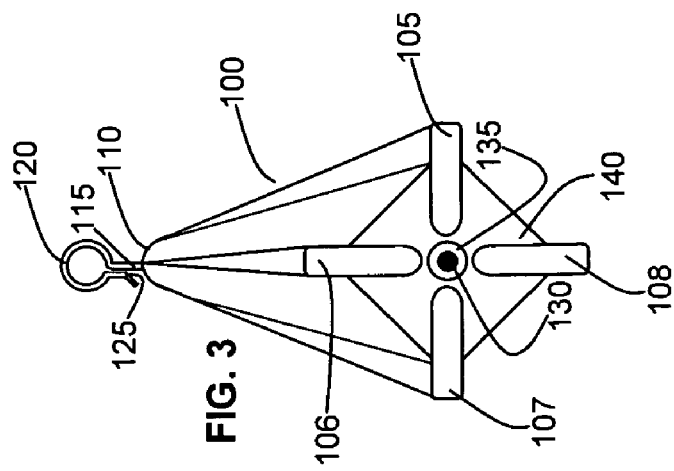
FIG. 1 shows a side view of an exemplary sinker according to an exemplary implementation of the invention.

As shown in FIG. 1, an exemplary sinker 100 according to principles of the invention is comprised of an integrally molded weighted body having a forwardly tapered pyramid-shaped body with four fins 105-108 projecting laterally therefrom. Fins 105-108 extend in a fore and aft direction for almost the entire length of the body of the sinker 100. The fins may taper in thickness and lateral extension from the trailing edge base of the sinker to the blunt leading edge of the sinker.

Figure 3:
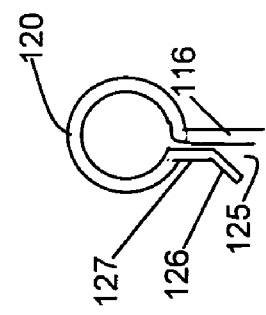
FIG. 3 shows a bottom perspective view of an exemplary sinker according to an exemplary implementation of the invention.
Figure 2:
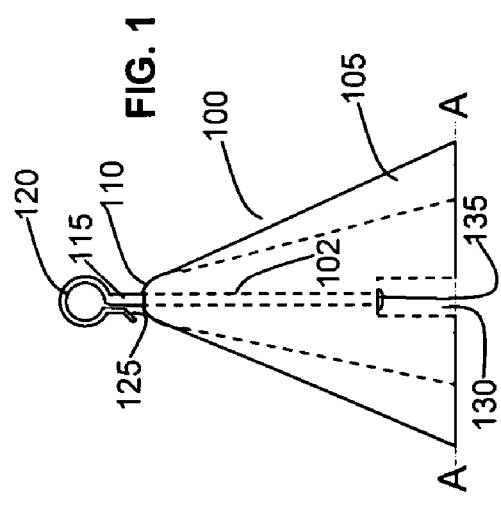
FIG. 2 shows a bottom view of an exemplary sinker according to an exemplary implementation of the invention.

The sinker 100 has a bulbous (i.e., blunt), semi-spherical front leading edge 110 (as shown in FIGS. 1 and 3) and a relatively flat generally rectangular finned trailing edge 140 (as shown in FIG. 2). A central axis passes through the center of the leading edge 110 and the center of trailing edge 140. A polyhedron body has a rectangular base 140 and triangular sides with the semi-spherical front leading edge as a common vertex.

A central channel 102 is provided for receiving an eyelet pin 115. An exemplary eyelet pin 115 includes an integrally formed slip-on eyelet 120, with a slip on opening 125, at the leading edge of the pin 115. The trailing edge 135 of the pin may be swaged to maintain the eyelet in position. The swaged trailing edge 135 of the pin 115 may preferably be disposed within a recessed opening 130 in the trailing edge 140 of the sinker 100 to guard the swaged end from damage. In an exemplary implementation, the pin 115 is free to rotate within the channel 102. However, because the sinker 100 is generally symmetrical it is not particularly susceptible to rotating about the pin 115.

The sinker is desirably cast of any suitable dense material having a specific gravity substantially greater than 1.0. Such materials may include metal, such as lead, zinc, babbitt, aluminum, alloys thereof, composites or the like. The sinker may be made in a variety of sizes and weights. In weights from one-half ounce up, the sinker may preferably made of a heavy metal such as lead, but in weights from one-half ounce down, the sinker may preferably made of lighter metal such as zinc or aluminum.

The eyelet pin 115 may be comprised of any suitable corrosion resistant material with adequate structural integrity. Such materials may include metal, such as stainless steel, aluminum, titanium, brass, alloys thereof or the like. The eyelet pin 115 may be made in a variety of sizes to fit the sinker 100 and is configured to freely spin, thus preventing twisting of the line.

Figure 4:
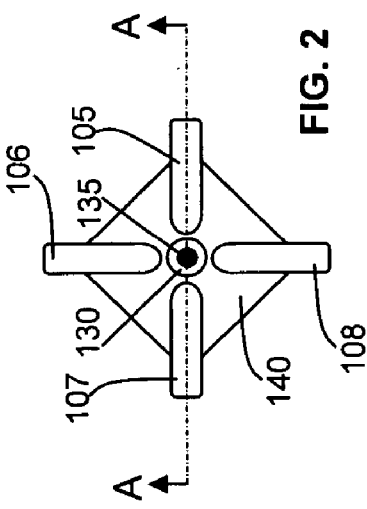
FIG. 4 shows an exemplary slip-on eyelet according to an exemplary implementation of the invention.

The slip-on eyelet portion 120 of the eyelet pin 115 is resilient and biased into a closed position. Integrally formed straight 127 and angled 126 arm portions of the slip-on eyelet 120 facilitate manually prying open the eyelet 125 to receive or release a line, as shown in FIG. 4. A slip-on eyelet opening 125 is defined between the vertical neck 116 portion of the eyelet pin 115 and the free end portions 126 and 127 of the eyelet. Upon releasing the prying force, the eyelet 120 springs back to a closed (or substantially closed) position with the opening 125 being either closed or narrower than the diameter of a fishing line. Those skilled in the art will appreciate that other slip-on eyelet configurations may be utilized without departing from the scope of the invention.

The fins 105-108 provide stability as the sinker moves through the water. The exemplary fins 105-108 taper from the trailing edge 140 of the sinker 100 towards the leading edge 110 of the sinker 100. The shape of the free edge of each fin 105-108 may vary from a relatively blunt edge as shown in FIGS. 2 and 3, to a relatively sharp or rounded free edge. The length of the fins may also vary from extending in a fore and aft direction for almost the entire length of the body of the sinker 100, to extending for a mere portion of the length of the body of the sinker 100.

Figure 5:
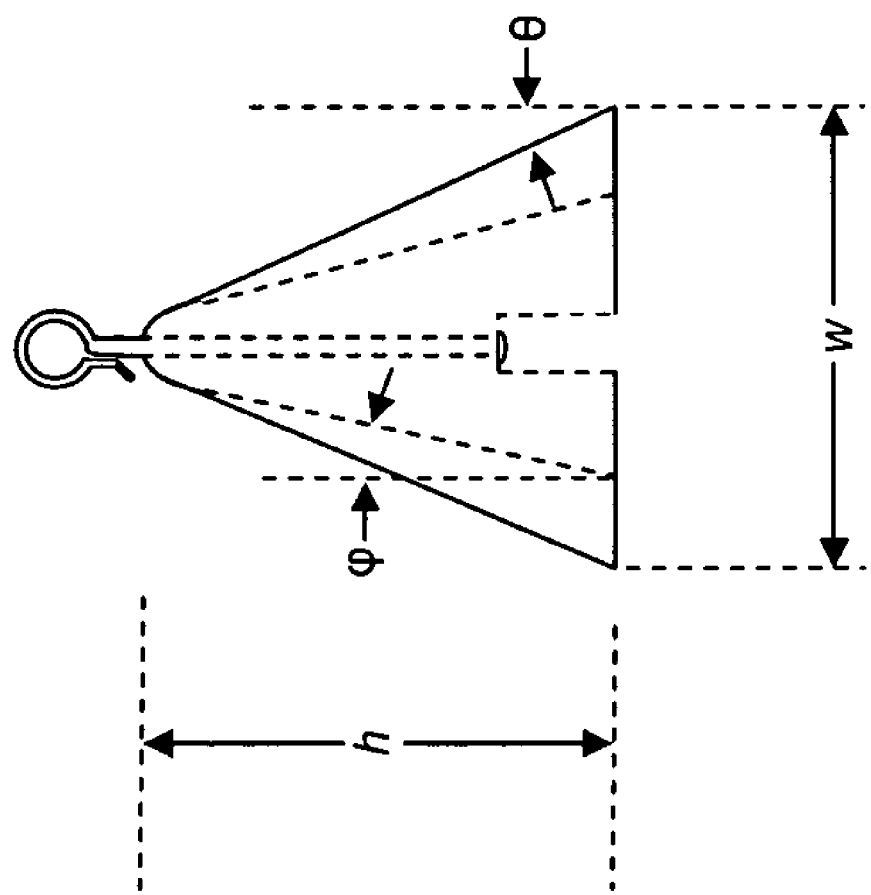
FIG. 5 shows a side view of an exemplary sinker according to an exemplary implementation of the invention.
Figure 6:
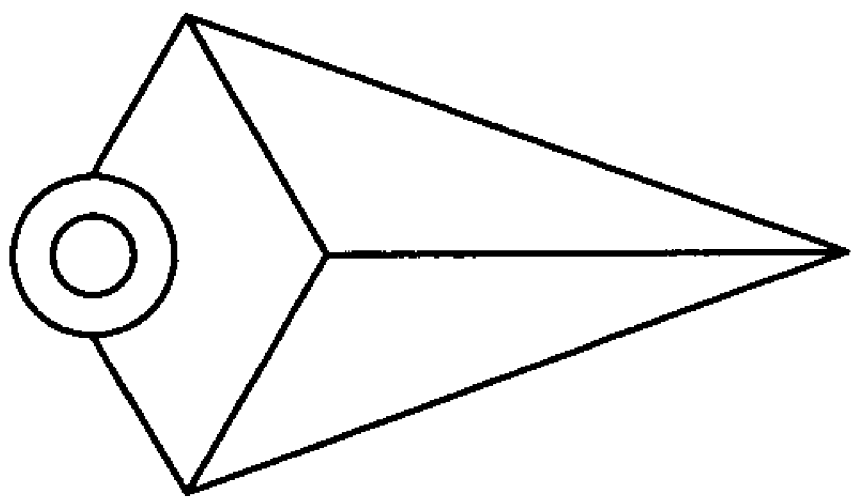
FIG. 6 shows a prior art pyramid sinker for illustrative purposes.

Those skilled in the art will appreciate that a sinker according to the principles of the invention is not limited to the geometry shown in FIGS. 1 through 3. By way of example and not limitation, the angle $\theta$, as shown in FIG. 5, may vary from approximately 10 to 30 degrees and the angle $\phi$ may vary from approximately 5 to 20 degrees. However, larger or smaller angles may be employed depending on the desired size and stability properties. The larger the ratio of angle $\theta$ to angle $\phi$, the more pronounced the effect of fins 105-108. The height h of the exemplary sinker may vary from approximately ½ inch to 2 inches. However, larger or smaller heights may be employed depending on the desired size and weight of the sinker.

In use, the sinker is connected at its slip-on eyelet 120 to a fishing line which carries a baited hook or an artificial lure 44. Advantageously, the streamlined shape of the sinker also makes it more aerodynamic during casting and minimizes splashing during entry into water. The blunt leading edge 110 leads the way through the air and into the water. The weight of the sinker causes the sinker to dive. As the sinker is drawn through the water, the fins 105-108 keep it on a straight course and counteracts any tendency for the sinker to veer to one side or the other. If the bait rotates, the fins resist rotation. Any tendency for the sinker to rotate is minimized due to the fact that the fins 105-108 are symmetrical. The blunt leading edge 110 and streamlined shape of the sinker reduces the tendency to snag in weeds and catch on underwater objects such as tree stumps or the like. As the sinker travels through water in direction of the leading edge 110 (i.e., blunt vertex), the leading edge becomes slightly elevated and the bottom and top triangular sides of the polyhedron body generate a net lifting force. Thus the sinker functions as a hydrofoil which produces a net lift force. The lift elevates the sinker off the floor, which reduces the tendency to snag objects on the bottom.

At rest on the bottom, a sinker according to principles of the invention allows bait to move, fairly freely around on the bottom surface, while anchoring it in the one place. As a fish touches the bait and even moves off with it, the exemplary sinker allows minimal resistance on the line. Concomitantly, the geometry of the exemplary sinker resists rolling and drifting on the bottom, which tend to interfere with detection of bites. Moreover, the eyelet 120, which may freely spin, resists undesirable twisting. Consequently, a fish is unaware of the line attached and an angler may immediately sense the bite and respond accordingly to set a hook.

In an exemplary implementation, a sinker according to principles of the invention includes a slip-on eyelet 120 which obviates twisting, tying, knots and fuss to secure the sinker to the line. The slip-on eyelet allows an angler to slip the sinker on the line for free-line fishing. With the sinker sliding free on the line, it will sink to the bottom and then allow the angler to work the bait off bottom like a pulley. A fish can then take the bait without sensing resistance from the weight of the sinker. When a fish begins to bite, an angler may immediately feel the fish on the line. The sinker will rest in place quietly on the bottom while the fish pulls out as much line as allowed, without feeling the weight of the sinker.

The slip-on eyelet 120 allows an angler to efficiently change sinker weights without having to cut and retie the line. When depth or structure changes, an angler may adjust the weight as desired. This makes a sinker according to principles of the invention extremely versatile and interchangeable. Additionally, an angler may slip-on additional sinkers to help release a snagged hook or lure. The additional sinkers, which may slide down to the hook or lure, provide additional weight to help release the hook or lure.

Advantageously, a sinker according to principles of the invention rests on flat surface of the sinker. The geometry is not conducive to rolling and drift with bottom currents. Thus, the sinker is not susceptible to drag and drifting forces on the line for a fish to detect.

A sinker according to principles of the invention may be used with other tackle. By way of example and not limitation, a pair of split shot may be added to the line as stops. The split shot may be positioned to define the distance of free movement of the sinker. This may be useful with floating bait, as the distance regulates the bait to bottom interval.

Another advantage of a sinker according to principles of the invention is that it is streamlined. The vertex makes the sinker quite aerodynamic, as it leads the way on casts through the air and into the water While the invention has been described in terms of various embodiments and implementations, those skilled in the art will recognize that the invention can be practiced with modification within the spirit and scope of the appended claims. The physical embodiments described above merely exemplify the invention, which may be embodied in other specific structure within spirit and scope of the claims appended hereto.

I claim:

1. A fishing sinker, comprising
a polyhedron body having a rectangular base and triangular sides with a common blunt vertex, said polyhedron body including a bulbous leading edge;
a central channel in said body;
an eyelet pin with a swaged end, a straight section extending through said central channel and an integrally formed eyelet portion protruding from the blunt vertex, wherein the eyelet portion is a resilient eyelet with a slip-on opening biased into a closed position, the slip-on opening is defined between a vertical neck portion of the straight section of the eyelet pin and a free end portion of the eyelet portion, and the free end portion of the eyelet portion includes an integrally formed straight arm section and an integrally formed angled arm section, said angled arm section defining a free end of the free end portion of the eyelet portion and said straight arm section being attached to said angled arm section; and a plurality of symmetrically arranged stabilizer fins extending along angles of intersection of each adjacent triangular side, wherein said sinker has a length and the plurality of symmetrically arranged stabilizer fins extend the length of the sinker.

2. The fishing sinker of claim 1, wherein the plurality fins taper in thickness from the rectangular base to the blunt vertex.

3. The fishing sinker of claim 1, wherein the plurality fins taper in lateral extension from the rectangular base to the blunt vertex.

4. The fishing sinker of claim 1, wherein the plurality fins have blunt free ends.

5. The fishing sinker of claim 1, wherein the plurality fins have sharp free ends.

6. The fishing sinker of claim 1, wherein the triangular sides of the polyhedron body are adapted to generate a net upward lifting force during motion of the sinker in a direction of the blunt vertex.

7. The fishing sinker of claim 1, wherein the plurality fins have semi-spherical free ends.

8. The fishing sinker of claim 1, wherein the plurality of fins have sharp free ends.

9. The fishing sinker of claim 1, wherein the polyhedron body and plurality of fins are integrally formed of a material from the group consisting of lead,
zinc,
steel,
stainless steel,
babbitt,
aluminum, and
an alloy of lead, zinc, steel or aluminum.

* * * * *